United States Patent
Higashiyama et al.

(10) Patent No.: US 6,842,183 B2
(45) Date of Patent: Jan. 11, 2005

(54) THREE-DIMENSIONAL IMAGE PROCESSING UNIT AND COMPUTER READABLE RECORDING MEDIUM STORING THREE-DIMENSIONAL IMAGE PROCESSING PROGRAM

(75) Inventors: Makoto Higashiyama, Sakurai (JP); Kentaro Nagayama, Osaka (JP)

(73) Assignee: Konami Corporation, Tokyo (JP)

( * ) Notice: Subject to any disclaimer, the term of this patent is extended or adjusted under 35 U.S.C. 154(b) by 214 days.

(21) Appl. No.: 09/900,910

(22) Filed: Jul. 9, 2001

(65) Prior Publication Data

US 2002/0003537 A1 Jan. 10, 2002

(30) Foreign Application Priority Data

Jul. 10, 2000 (JP) ........................................ 2000-209016

(51) Int. Cl.⁷ ................................................. G09G 5/02
(52) U.S. Cl. ........................ 345/592; 345/420; 345/422
(58) Field of Search ................................ 345/592, 420, 345/422

(56) References Cited

U.S. PATENT DOCUMENTS

| | | | |
|---|---|---|---|
| 6,361,438 B1 * | 3/2002 | Morihira ...................... | 463/31 |
| 2001/0040584 A1 * | 11/2001 | Deleeuw ...................... | 345/629 |
| 2002/0163519 A1 * | 11/2002 | Kitsutaka .................... | 345/440 |

OTHER PUBLICATIONS

Rokita P: "Application of image processing techniques in computer graphics algorithms" Computer Networks and ISDN Systems, North Holland Publishing. Amsterdam, NL, vol. 29, No. 14, Oct. 1, 1997, pp. 1705–1714, XP004099472 ISSN: 0169–7552 * abstract * * p. 1705, left–hand column, last paragraph—p. 1706, left–hand column, paragraph 1 * * p. 1706, left hand column, line 42– last line * * p. 1706, right hand column, last paragraph—p. 1707, right–hand column, paragraph 1 * * p. 1707, right–hand column, last paragraph—p. 1708, right–hand column, line 30 *.

Colby G Scholl L: "Transparency and blur as selective cues for complex visual information" Proceedings of the SPIE, SPIE, Bellingham, VA, US, vol. 1460, Feb. 26, 1991, pp. 114–125, XP002956205 * abstract) * p. 114, paragraph 2 * * p. 116, paragraph 2–paragraph 4 * * p. 116, last paragraph—p. 117, last paragraph *.

(List continued on next page.)

*Primary Examiner*—Mark Zimmerman
*Assistant Examiner*—Adam Arnold
(74) *Attorney, Agent, or Firm*—Jordan and Hamburg LLP

(57) ABSTRACT

A 3D image processing unit for applying a specified image processing to display a model located in a simulated 3D space on a monitor after rendering processing. The 3D image processing unit includes a memory unit for storing a rendered model image as a collection of pixel data and distance information from a viewing point of a simulated camera in correspondence with respect to said pixel data; image processing unit for applying semitransparent processing to each pixel data read from the memory unit; rewriting unit for rewriting the pixel data with said distance information from the viewing point of the simulated camera that is a specified reference value or larger; and control unit for causing the image processing unit and the rewriting unit to repeatedly operate a specified number of times while successively increasing the specified reference value and successively increasing a degree of transparency.

13 Claims, 4 Drawing Sheets

OTHER PUBLICATIONS

Potmesil M et al: "A Lens and Aperture Camera Model for Synthetic Image Generation" Computer Graphics, New York, NY, US, vol. 15, No. 3, Aug. 1981, ISSN: 0097–8930 * abstract * * p. 297, right–hand column, last paragraph—p. 298, left–hand column, paragraph 1 * * p. 301, right–hand column, last paragraph—p. 302, right–hand column, paragraph 1 * * figures 10–13 *.

Cook R L et al: "Distributed Ray Tracing" Computers and Graphics, Pergamon Press Ltd. Oxford, GB, vol. 18, No. 3, Jul. 1984, pp. 137–145, XP000890058 ISSN: 0097–8493 * abstract * * p. 138, right–hand column, paragraph 3–paragraph 5 * * p. 139, left–hand column, paragraph 2—p. 140, left–hand column, paragraph 1 * *figures 4, 5*.

* cited by examiner

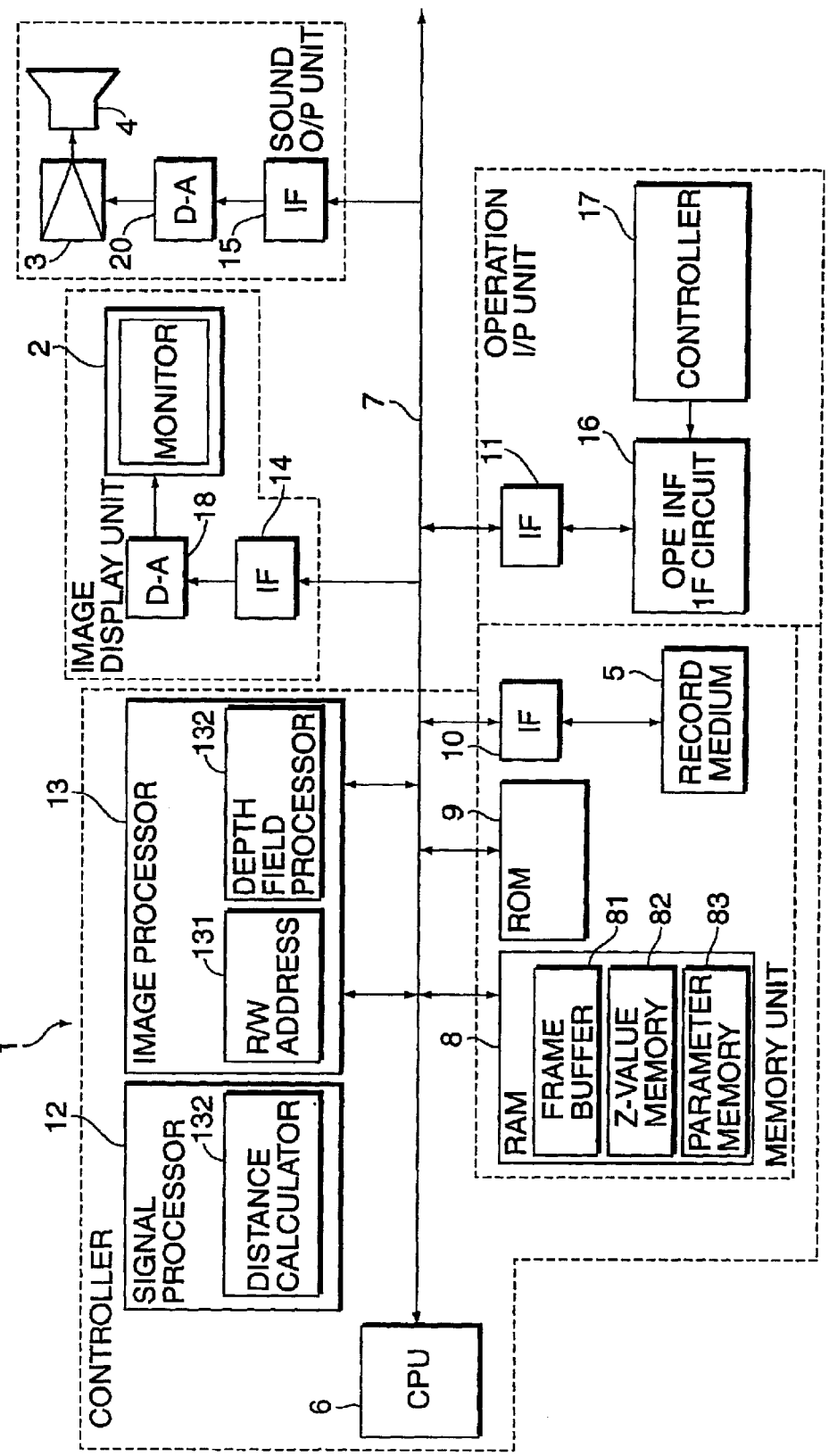

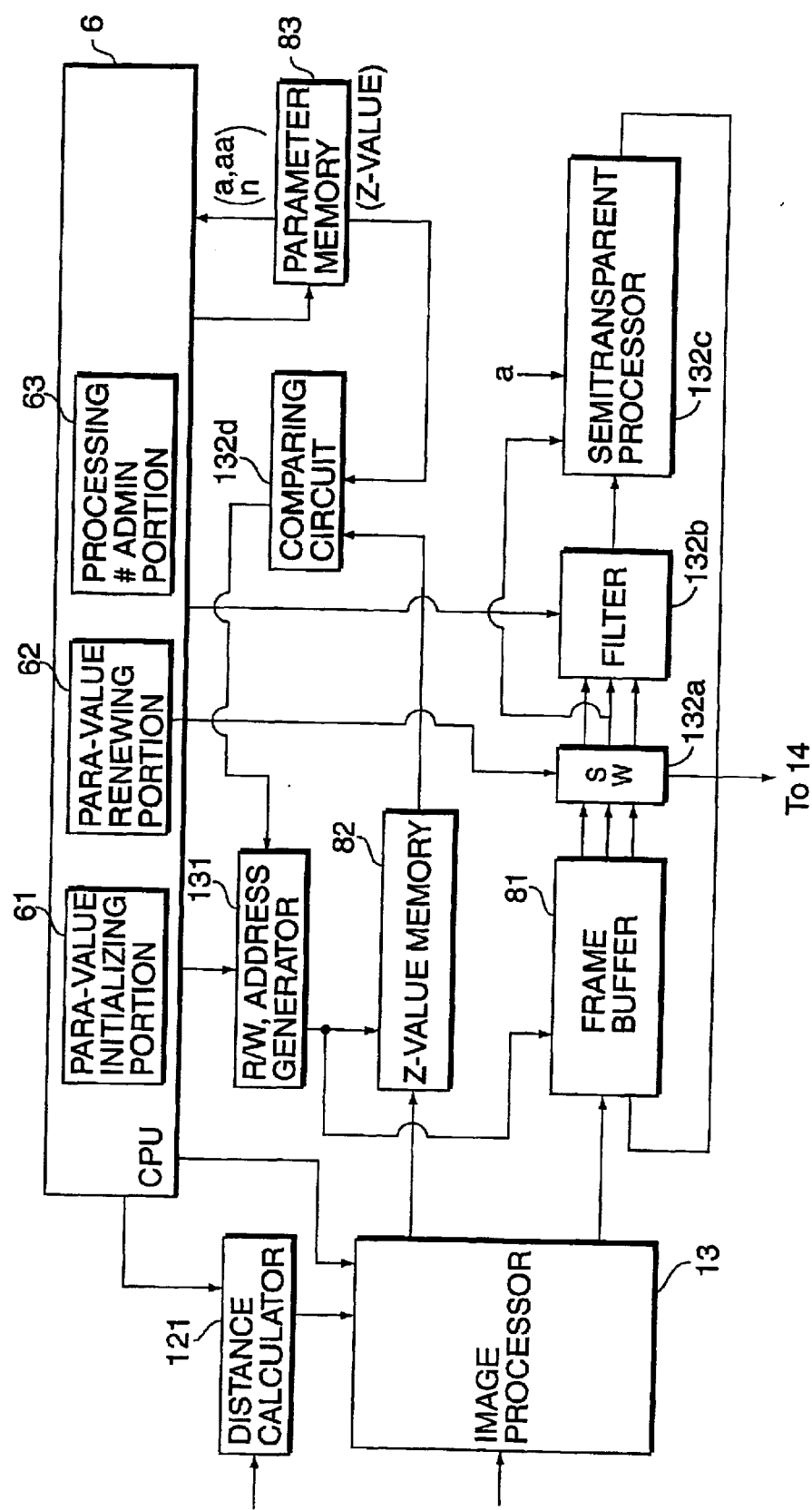

THREE-DIMENSIONAL IMAGE PROCESSING UNIT AND COMPUTER READABLE RECORDING MEDIUM STORING THREE-DIMENSIONAL IMAGE PROCESSING PROGRAM

The present invention relates to a three-dimensional (3D) image processing technique of applying a specified image processing to display a model located in a simulated 3D space on a monitor after rendering it, which technique is applied, for example, to video game apparatuses.

BACKGROUND OF THE INVENTION AND RELATED ART STATEMENT

A hardware capable of displaying a 3D polygon with texture mapping and using semitransparent processing and fogging as special functions has been conventionally known. The semitransparent polygon processing is used, when a polygon is to be pictured, to exhibit such an effect of making an object model behind look through the polygon pictured by mixing a color data of a frame buffer and that of the polygon to be pictured at a desired rate for each pixel position. Further, fogging is used to exhibit such an effect of fogging an object by calculating a distance between an object model to be pictured and a viewing point of a simulated camera, setting a ratio of colors such that a mixture of these colors approaches a designated color according to the distance, and mixing these colors.

In photographing by a camera, a depth of field exists and objects more distant than the depth of field about a focusing position are blurred. If such a phenomenon is applied to a simulated 3D space such as a game space, a better presence of attendance can be provided. If it is applied to a video game, a better cubic effect can be provided and a possibility of providing a game using the presence of a depth of field can be given. However, this could not be realized by the conventional semitransparent processing and fogging.

SUMMARY OF THE INVENTION

In view of the above situation, an object of the present invention is to provide an image processor for processing a 3D image such that an effect of exhibiting a depth of field can be easily presented when an object model located in a simulated 3D space is displayed on a monitor, and a readable recording medium storing a 3D image processing program.

In order to fulfill the above object, according to the present invention, 3D image processing unit for applying a specified image processing to display a model located in a simulated 3D space on a monitor after rendering processing. The 3D image processing unit, according to the present invention comprises a memory unit for storing a rendered model image as a collection of pixel data and distance information from a viewing point of a simulated camera in correspondence with respect to said pixel data; image processing unit for applying semitransparent processing to each pixel data read from the memory unit; rewriting unit for rewriting the pixel data with said distance information from the viewing point of the simulated camera that is a specified reference value or larger; and control unit for causing the image processing unit and the rewriting unit to repeatedly operate a specified number of times while successively increasing the specified reference value and successively increasing a degree of transparency.

With the above 3D image processing unit, each of the pixel data is stored at corresponding pixel location and is readable from the memory unit and the read out pixel data is subject to the semitransparent processing and distance information with respect to each of the pixel data is stored in the memory unit. The distance information with respect to each of the pixel data is judged as to whether it is equal or larger than the specified reference value. Then the pixel data that underwent semitransparent processing having the corresponding distance information equal to or larger than the specified reference value is rewritten to at the same pixel position in the memory unit. The semitransparent processing is repeated by the specified number of times while the specified reference value being increased and the degree of transparency being increased successively. Accordingly, the image displayed in the simulated 3D space is given a great stage effect of the depth of field processing.

These and other objects, features and advantages of the present invention will become more apparent upon a reading of the following detailed description and accompanying drawings.

BRIEF DESCRIPTION OF THE DRAWINGS

FIG. 1 is a block diagram showing one embodiment of a game apparatus to which a 3D image processing unit according to the present invention is applied, FIG. 2 is an exemplary block diagram for the execution of a depth of field processing, FIGS. 3A, 3B and 3C are diagrams showing image examples used to explain the depth of field processing, wherein FIG. 3A shows a screen before the processing, FIG. 3B shows a screen after completion of a first loop, and FIG. 3C shows a screen after completion of a second loop.

DETAILED DESCRIPTION OF THE PREFERRED EMBODIMENTS OF THE PRESENT INVENTION

Figure 3A:
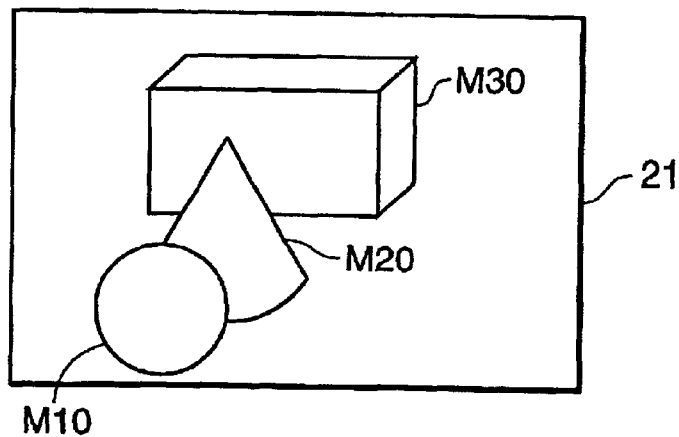

FIG. 1 is a block diagram showing one embodiment of a game apparatus to which a 3D image processing unit according to the present invention is applied.

In FIG. 1, a game apparatus 1 is provided with a main game unit (not shown), a monitor 2 for displaying images of a game, a main preamplifier 3 and a loudspeaker 4, and a recording medium 5 storing game data including image data, sound data and program data is mountable if necessary. The recording medium 5 may be built in or detachably mountable into the main game unit, and a ROM cassette, an optical disk, a flexible disk may be used as the recording medium 5 in addition to a ROM in which a game program is stored.

Operations in the main game unit and a control system are realized by connecting a RAM 8 for temporarily storing various data, a ROM 9 for storing programs such as an operation system, interface circuits 10, 11, 14, 15, a signal processor 12 and an image processor 13 with a CPU 6 as a central processing unit for controlling the respective elements via buses 7 including address busses, data buses and controller buses. In the case of a detachably mountable recording medium 5, various data in the CPU 6 are read and written in the RAM 8 all at once or successively if necessary with the recording medium 5 mounted in the main game unit.

The RAM 8 includes a frame buffer 81 having a storage capacity corresponding to the number of pixels forming at least one screen and adapted to temporarily store an image to be displayed on the monitor 2, a Z-value memory 82 for storing a distance information of a pixel data corresponding to each pixel of the image stored in the frame buffer 81, and a data memory 83 for storing various parameters necessary for a depth of field processing and other necessary data. The ROM 9 is adapted to store a program of an operation system and the like.

The signal processor 12 performs calculation of positions of object models such as a character and a fixed object in a simulated 3D space and calculation of a moved position of a viewing point (position) of a simulated camera, generation and processing of sound data, and is provided with a distance calculator 121 for calculating distances of the respective object models from the viewing point of the simulated camera.

The image processor 13 writes the image data to be displayed on the monitor 2 in the frame buffer 81 pixel by pixel using the respective calculation results from the signal processor 12 (rendering texture mapping processing) and is provided with an address generator 131 for giving a read/write (R/W) commands to the RAM 8 and designating the pixel of the frame buffer 81, and a depth of field processor 132 for executing the depth of field processing to be described later.

A digital-to-analog (D/A) converter 18 feeds a video signal from the interface circuit 14 to the monitor 2 after converting it into an analog signal. The image data written in the frame buffer 81 is fed to the monitor 2 via the interface circuit 14 and the D/A converter 18 to be displayed thereon. A D/A converter 20 and a main preamplifier 3 feed a sound signal inputted via the interface circuit 15 to the loudspeaker 4 after converting it into an analog sound signal and amplifying it. According to a gaming condition, the generated sound data is written using a partial area of the RAM 8.

A controller 17 is provided with operable members such as operation buttons and operation levers operable by a game player, and signals corresponding to operations made to these operable members are fed to the CPU 6 via an operation information interface circuit 16 and the interface circuit 11. In this way, a main character on the monitor is caused to make a motion, an action and a speech intended by the game player, thereby proceeding the game.

The CPU 6 executes such a control as to move the viewing point (and viewing direction) of the simulated camera during the game in accordance with an instruction given from the controller 17 and/or the game program. In this way, the main character or the like can be so displayed as not to move out of the screen of the monitor 2, preferably displayed substantially in the center and in a suitable size.

FIG. 2 is an exemplary block diagram for the execution of the depth of field processing. The depth of field processing is performed to make the game image displayed on the monitor 2 gradually more blurred as a distance from the viewing point of the simulated camera increases, i.e. as the position is more distant in depth direction (z-direction) and to display the images of the respective pixels in such a manner as to gradually merge into (harmonize with) a surrounding color.

The CPU 6 is provided with a parameter value initializing portion 61 for initializing various parameter values used in the depth of field processing, a parameter value renewing portion 62 for successively switching the parameter values every time a loop processing to be described later is completed, and a processing number administering portion 63 for administering the number of the performed loop processings.

The image processor 132 is provided with a switch 132a for selectively switching an output direction of a pixel data at each pixel position read from the frame buffer 81, a filter 132b for averaging the pixel data, a semitransparent processing device 132c for applying semitransparent processing to the pixel data, and a comparing circuit 132d for comparing the distance pixel by pixel.

The switch 132a switches the data output directions so that the pixel data are outputted to the filter 132b during the depth of field processing while being introduced to the interface 14, i.e. to the monitor 2 after the depth of field processing. The filter 132b associates data of eight pixels around an object pixel, i.e. above, below, at the left and right and oblique from the object pixel and averages (adds) using a digital filter (for example, coefficients for the respective pixels are all set at ⅑ or alternatively weighted averaging system in which coefficients are differed may be adopted). This averaging enables the object pixel to be merged into the surroundings. The semitransparent processing device 132c is constructed by hardware for executing, for example, an operation: $(G2-G1) \times a + G1$, where G2, G1 and "a" denote a pixel data after filtering, a pixel data before filtering and a parameter of a transparency value. Execution of the semitransparent processing by hardware is more suited to a high-speed processing and can sufficiently follow a rewriting cycle (frame cycle) of the game image. Besides using the hardware, processing by software may be performed provided that a specified high-speed processing is possible.

The comparing circuit 132d outputs a rewrite command signal to the R/W address generator 131 if the distance Z from the viewing point of the simulated camera is equal to or longer than a predetermined reference (depth) value "z" and causes the pixel data of the object pixel processed by the semitransparent processing device 132c to be rewritten at the same pixel position of the frame buffer 81. The comparing circuit 132d is provided with a timing adjusting function, e.g. a delay circuit so that the Z-value of the pixel position corresponding to the object pixel having been subjected to the semitransparent processing is synchronously discriminated. Alternatively, an address control may be executed so that the Z-value of the object pixel is read from the Z-value memory 82 in consideration of a delay period.

The address generator 131 successively designates the addresses from the leading address to the last address to the frame buffer 81 to successively read the pixel data, and performs a processing to rewrite or not to rewrite the pixel data according to the comparison result, thereby executing one loop processing. It should be noted that the comparing circuit 132d and the address generator 131 fulfill the function of the rewriting means.

As parameters used in the depth of field processing, an initial transparency value "a", a transparency added value "aa", an initial reference depth value "z", a reference depth added value "za" and the number "n" of the loop processing (loop processing number) are prepared in this embodiment.

The parameter value initializing portion 61 sets the initial transparency value "a" and the initial reference depth value "z" to an initial value 0 and the loop processing number "n" to "n0" to be administered every screen rewriting cycle (frame cycle) to the monitor 2. The parameter value renewing portion 62 adds the transparency added value "aa" to the present transparency value "a", adds the reference depth added value "za" to the present reference depth value "z" and increments the loop processing number "n" by 1 every time one loop processing is performed. The processing number administering portion 63 monitors the loop processing number "n" and outputs an end signal to complete the depth of field processing when the processing number "n" reaches the predetermined value "n0".

Figure 3B:
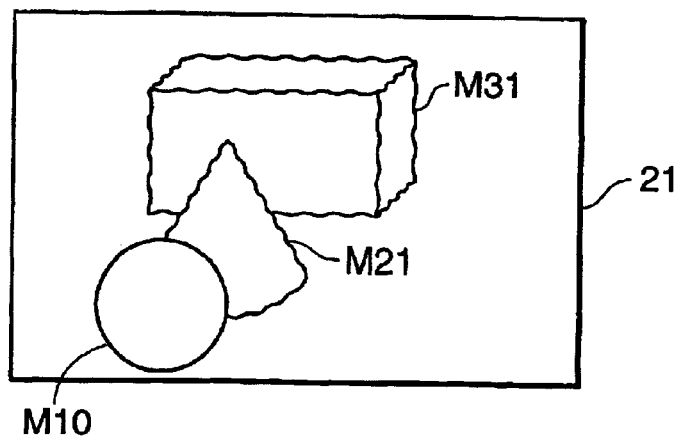
Figure 3C:
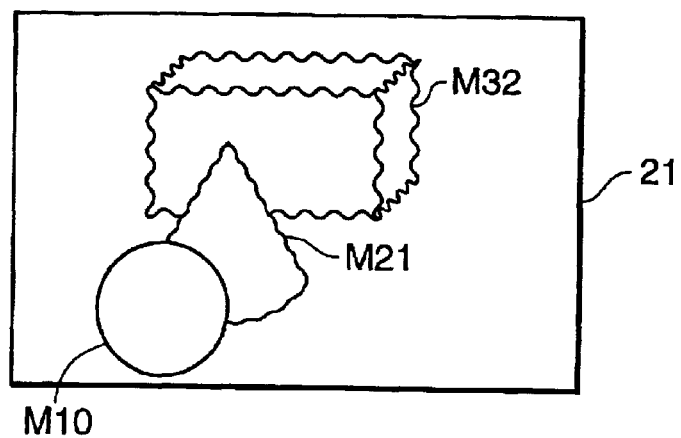

FIGS. 3A, 3B and 3C are diagrams showing image examples used to explain the depth of field processing, wherein FIG. 3A shows a screen before the processing, FIG. 3B shows a screen after completion of a first loop, and FIG. 3C shows a screen after completion of a second loop. It should be noted that the processing number "n0" to be administered is at least two or larger.

As shown in FIG. 3A, a sphere model M10, a cone model M20 and a rectangular parallelepiped model M30 are displayed on a screen 21 of the monitor 2 while being successively aligned in a direction more away from the viewing point of the simulated camera. The sphere model M10 is located within a distance z1, the cone model M20 is located within a distance range of z1 to z2, and the rectangular parallelepiped model M30 is located farther than the distance z2 from the viewing point of the simulated camera.

For the sake of convenience, description is made assuming that reference depths for the first and second loops are z1, z2, respectively. Upon completion of the first loop processing, the sphere model M10 remains unchanged, but the cone model M20 and the rectangular parallelepiped model M30 have been changed into a cone model M21 and a rectangular parallelepiped model M31 (represented by wavy lines in FIG. 3B) after having been subjected to filtering and semitransparent processing as shown in FIG. 3B. Subsequently, after completion of the second loop processing, the sphere model M10 still remains unchanged (see FIG. 3A), the cone model M21 remains the same as the one after the first loop, and only the rectangular parallelepiped model M31 has been changed into a rectangular parallelepiped model M32 (degree of waviness increased) after having been further subjected to filtering and semitransparent processing as shown in FIG. 3C.

Figure 4:
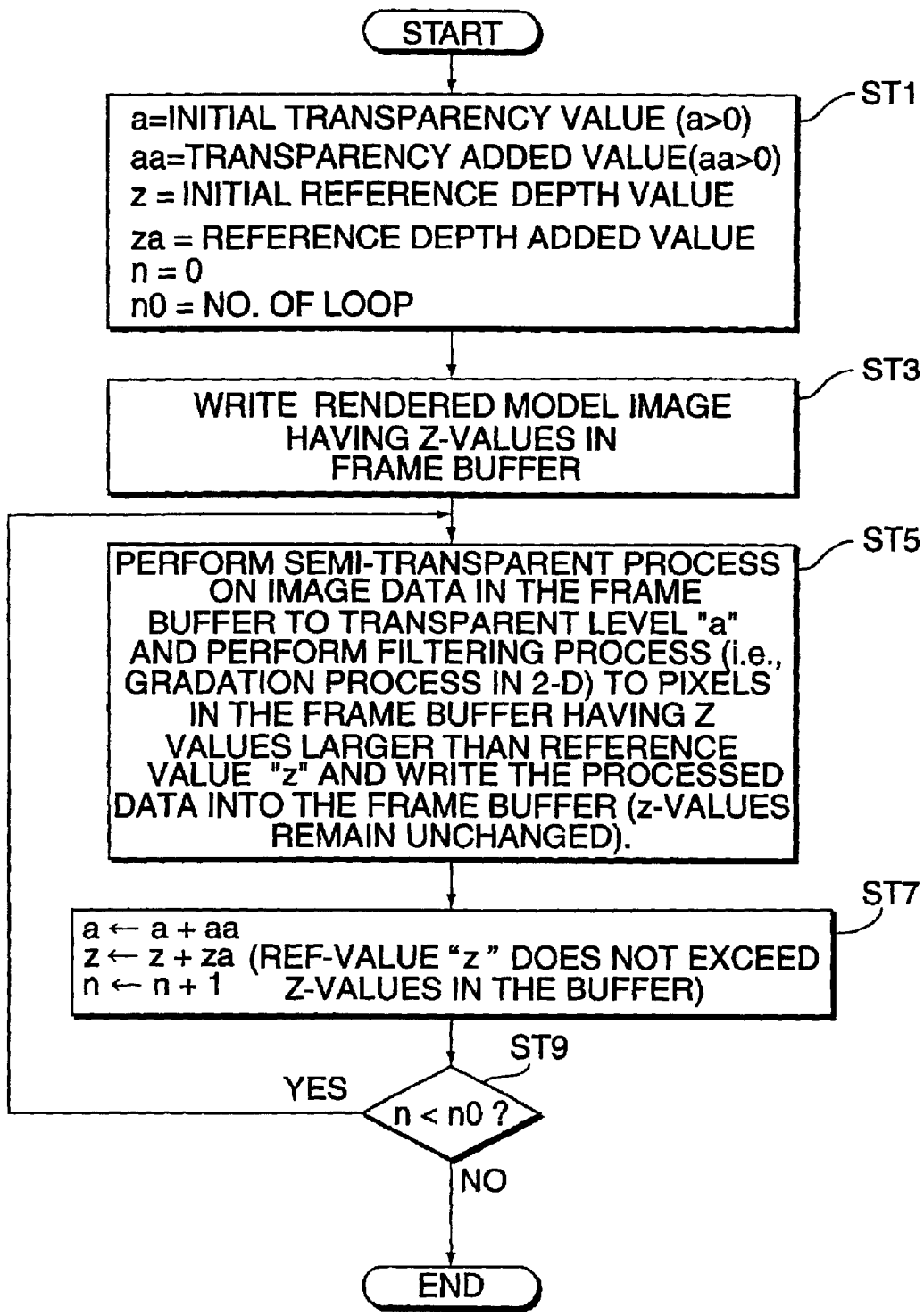
FIG. 4 is a flow chart showing a procedure of the depth of field processing.

FIG. 4 is a flow chart showing a procedure of the depth of field processing.

Upon starting this flow chart, the initial transparency value "a", the transparency added value "aa", the initial reference depth value "z" and the reference depth added value "za" are set at the initial value 0 and the loop processing number "n" is set at "n0" (Step S1). Subsequently, the rendered model image from the image processor 13 is written in the frame buffer 81 (Step S3). When the image data is written in the frame buffer 81, the depth of field processing is performed. Specifically, the data of the object pixels and those of their neighboring pixels are synchronously read from the frame buffer 81 by successively designating the pixel positions. The read data are subjected to the semitransparent processing via the hardware for executing the aforementioned operation after being subjected to the filtering, and such a processing as to rewrite the pixel data after the processing over the object pixel in the frame buffer 81 or not to rewrite based on the presence or absence of the rewrite command signal from the comparing circuit 132d is successively performed for the leading pixel through the last pixel (Step S5).

Upon confirming the completion of the first loop processing, the parameters are changed (renewed). Specifically, the transparent added value "aa" is added to the initial transparency value "a", the reference depth added value "za" is added to the initial reference depth value "z", and the loop processing number "n" is incremented by 1 (Step S7). Then, it is discriminated whether the loop processing number "n" is less than the loop processing number "n0" to be administered (Step S9).

If the discrimination result in Step S9 is affirmative, this routine returns to Step S3 to execute Steps S5, S7 for the second loop using the new transparency value "a" and reference depth value "z". The loop processing is performed until the discrimination result becomes negative in Step S9. Thus, in the second loop, the transparency added value "aa" is added to the first transparency value "a" and the reference depth added value "za" is added to the reference depth value "z", with the result that the present transparency value "a" and the present reference depth value "z" are successively increased as more loop processings are performed. In this way, the presentation effects of the blurred images and the images having been subjected to the semitransparent processing become exponential as in the case of the actual depth of field. On the other hand, if the discrimination result in Step S9 is negative (NO in Step S9), this flow ends. Thereafter, the image display processing is started, i.e. the CPU 6 causes the switch 132a to be switched to the monitor 2.

As described above, the filtering processing and the semitransparent processing are substantially enabled only by the memory capacity of the frame buffer 81, and the model images can be gradually blurred and merge into and harmonize with the surrounding colors in depth direction by a simple construction and a high-speed processing.

The present invention may be embodied as follows.

(1) Although the transparency added value "aa" and the reference depth added value "za" are fixed values in the foregoing embodiment, the transparency added value "aa" and/or the reference depth added value "za" may be individually so set at suitable values as to correspond to the loop processing number, e.g. by means of correspondence in a table format. In such a case, presentation effects of a desired blurredness and a desired semitransparent processing can obtained. Particularly, possibility and versatility can be further increased if the blurredness and the semitransparent processing can be changed according to needs.

(2) Instead of constructing the depth of field processing device 132 by hardware, it may be realized by software. In such a case, a processing program in accordance with the processing procedure of the hardware may be written.

(3) If the depth of field processing is performed at least once as a loop processing, blurredness in depth direction and mergence into and harmonization with the surroundings can be at least expressed.

(4) Although the semitransparent processing is performed using the pixel data having been subjected to the filtering processing in the foregoing embodiment, these two processings may be simultaneously performed or performed in a reverse order. In other words, in which sequence they are performed does not matter provided that both blurredness and mergence into and harmonization with the surroundings can be suitably expressed on the monitor screen. Averaging by the filter 132b may be performed using a device other than the digital filter. Further, it is not necessary to set the respective coefficients of the digital filter at constant values. Desired coefficients may be set according to the aimed blurred state and semitransparent processing. In such a case, averaging may be performed using four (2×2) pixel data or data of pixels arrayed in different numbers in column and row directions (e.g. 1×2, 2×3) instead of using 9 pixel data.

(5) The game apparatus according to the foregoing embodiment takes various modes including so-called a game apparatus for business use, a game apparatus for home use and a general personal computer. In the case of the game apparatus for business use, the controller 17 includes a joystick or various shot-switches as an operation input device as described above, and the monitor unit includes a special CRT, liquid crystal display or like monitor 2 and a projection screen onto which an image is to be projected from the monitor 2. In the case of the game apparatus for home use, the controller 17 normally includes a cross-shaped key and various operation buttons, the control unit and the like are all installed in the game apparatus, and TV monitors are often used as the monitor. Further in the case of the personal computer, a keyboard, a mouse or like input device may be used as the controller 17, and a graphic display is used as the monitor. Further in the case of the game apparatus for home use and the personal computer, the game program stored in the game program storage is initially stored in a floppy disk, CD-ROM, photomagnetic disk, DVD-ROM or like recording medium readable by the computer, and is transferred to the main game unit by reading this recording medium by means of a reading means provided in the game apparatus for home use and the person computer.

With the aforementioned features of the present invention, the following advantages will be obtained.

The image displayed in the simulated 3D space is given a great stage effect of the depth of filed processing with ease and relatively simple structure. The images within the range of the specified reference depth value are not subject to the image processing (such as semitransparent processing), thus the image displayed on the screen as a whole becomes similar to the images taken by a camera or video-camera, enabling to produce the realistic images on the screen. Moreover, those images located further away from a viewer (a game player) in the depth direction of the screen appear blurred (indistinct) than the other images located closer to the viewer in the depth direction of the screen, enabling realistic display of images on the screen. Furthermore, the further the images displayed on the screen being away from the viewer, the more the images appear to fuse into the surrounding, enabling more realistic presentation of the images on the screen. In addition, the depth of field processing is carried out in case the viewing point of the simulated camera is moved.

This application is based on Japanese application serial no. 2000-209016 filed in Japan on Jul. 10, 2000, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A 3D image processing unit for applying a specified image processing to display a model located in a simulated 3D space on a monitor after rendering processing, said 3D image processing unit comprising:

a first memory for storing a rendered model image as a collection of pixel data, a second memory for storing a distance information relating a distance from a viewing point of a simulated camera to the rendered model image in correspondence with each pixel position, an image processing means for applying averaging and semitransparent processing to each pixel data read from the first memory, a rewriting means for rewriting the pixel data from the image processing means at the same pixel position as that of the first memory from which the pixel data was read when said distance information from the viewing point of the simulated camera is a specified reference value or larger, and a control means for causing the image processing means and the rewriting means to repeatedly operate only a specified number of times each successively increasing the specified reference value and successively increasing a degree of transparency of pixels having distance data equal to or greater than the specified reference value such that pixels having distances further from the simulated camera position appear with greater transparency than pixels having distance closer to the simulated camera position, and the image in the first memory being introduced to the monitor after processing by the control means is completed.

2. A 3D image processing unit according to claim 1, wherein the image processing means applies the semitransparent processing to the averaged pixel data.

3. A 3D image processing unit according to claim 1, wherein the rewriting means does not rewrite the pixel data at the pixel position where said distance information from the viewing point of the simulated camera is below the specified reference value.

4. A 3D image processing unit according to claim 1, wherein the control means successively increases the specified reference value by a predetermined amount.

5. A 3D image processing unit according to claim 1, wherein the control means successively increases the degree of transparency by a predetermined amount.

6. A 3D image processing unit according to claim 1, further comprising an externally operable member capable of moving the viewing point of the simulated camera in the simulated 3D space as it is operated, and a distance calculating means for calculating the distance from the viewing point of the simulated camera for each pixel position.

7. A computer-readable recording medium storing an executable 3D image processing program for applying a specified image processing to a model image rendered from a model located in a simulated 3D space and stored in a frame buffer to display the model image to display it on a monitor, said processing program comprising the steps of:

storing a distance information relating a distance from a viewing point of a simulated camera to each pixel position of the model image in correspondence with each pixel position;

reading pixel data from the frame buffer and applying averaging and semitransparent processing thereto for the pixel data at the pixel position where said distance information from the viewing point of the simulated camera is a specified reference value or larger, rewriting a storage content at the pixel position of the frame buffer from which the pixel data was read;

repeatedly performing the averaging and semitransparent processing and rewriting a specified number of times each successively increasing the specified reference value and a degree of transparency imparted by the averaging and semitransparent process such that pixels having distances further from the simulated camera position appear with greater transparency than pixels having distance closer to the simulated camera position; and introducing image in the frame buffer to the monitor after the averaging and semitransparent processings are completed.

8. The computer-readable recording medium storing 3D image processing program according to claim 7, herein the semitransparent processing is applied to the averaged pixel data.

9. The computer-readable recording medium storing 3D image processing program according to claim 7, wherein the rewriting is such that the pixel data is not rewritten for the pixel position where said distance information from the viewing point of the simulated camera is below the specified reference value.

10. The computer-readable recording medium storing 3D image processing program according to claim 7, wherein the specified reference value is successively increased by a predetermined amount.

11. The computer-readable recording medium storing 3D image processing program according to claim 7, wherein the degree of transparency is successively increased by a predetermined amount.

12. The computer-readable recording medium storing 3D image processing program according to claim 7, wherein the viewing point of the simulated camera is moved as an externally operable member is operated, and the distance from the viewing point of the simulated camera is calculated for each pixel position.

13. A 3D image processing unit for applying a specified image processing to display a model located in a simulated 3D space on a monitor after rendering processing, said 3D image processing unit comprising:

a memory unit for storing a render model image as a collection of pixel data and distance information relating a distance from a viewing point of a simulated camera to pixels of the rendered model image in correspondence with respect to said pixel data, image processing unit for applying semitransparent processing to each pixel data read from the memory unit, rewriting unit for rewriting the pixel data from the image process unit with said distance information from the viewing point of the simulated camera that is a specified reference value or larger, and control unit for causing the image processing unit and the rewriting unit to repeatedly operate a specified number of times each successively increasing the specified reference value and successively increasing a degree of transparency of pixels having distance data equal to or greater than the specified reference value such that pixels having distances further from the simulated camera position appear with greater transparency than pixels having distance closer to the simulated camera position.

* * * * *